(12) United States Patent
Ghoshal et al.

(10) Patent No.: US 10,097,974 B1
(45) Date of Patent: Oct. 9, 2018

(54) OPPORTUNISTIC CONTENT PRESENTATION DURING TEMPORARY OPERATION MODES OF A MOBILE COMMUNICATION DEVICE

(71) Applicant: Sprint Communications Company L.P., Overland Park, KS (US)

(72) Inventors: Jagannath Ghoshal, Olathe, KS (US); Dale S. Schempp, Lenexa, KS (US); Kristin B. Wear, Overland Park, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 61 days.

(21) Appl. No.: 15/404,194

(22) Filed: Jan. 11, 2017

(51) Int. Cl.
*H04W 4/50* (2018.01)
*H04W 4/00* (2018.01)

(52) U.S. Cl.
CPC ............ *H04W 4/50* (2018.02); *H04W 4/001* (2013.01)

(58) Field of Classification Search
CPC ................................ H04W 4/50; H04W 4/001
See application file for complete search history.

(56) References Cited

U.S. PATENT DOCUMENTS

| | | | |
|---|---|---|---|
| 9,924,292 B1* | 3/2018 | Schmitt | H04W 4/001 |
| 2014/0329565 A1* | 11/2014 | Mannix | H04M 1/72569 455/566 |

* cited by examiner

*Primary Examiner* — Marcos Torres

(57) ABSTRACT

A mobile communication device. The device comprises a processor, a memory, an activation client stored in the memory, and a content client stored in the memory. When executed by the processor during a process of activating the device, the activation client establishes a slot-0 communication channel and completes an activation of the device with a provisioning server in the provisioning infrastructure via a plurality of activation messages exchanged via the slot-0 communication channel. When executed by the processor, the content client parses and analyzes the parsed activation messages, based on analyzing the parsed activation messages, sends a request for content to a media server over the slot-0 communication channel, receives the requested content via the slot-0 communication channel, and presents the received content in a first window of a split-screen in a visual display, where the activation client presents activation information in a second window of the split-screen.

18 Claims, 8 Drawing Sheets

OPPORTUNISTIC CONTENT PRESENTATION DURING TEMPORARY OPERATION MODES OF A MOBILE COMMUNICATION DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices, for example cell phones, typically undergo a process of wireless communication service activation before they are able to support normal wireless communication functions such as placing and receiving standard voice calls or conducting web browser sessions on the Internet. The activation process may entail, for example, configuring information in a core network of a wireless communication network, for example an authentication database. The activation process may entail, for example, associating hardware unique identifiers with a subscription account and/or a mobile subscriber number (MSN) or phone number. The activation process may entail configuring the mobile communication device with a voice-mail box or service. The activation process may entail downloading and installing one or more preferred roaming lists on the mobile communication device. The activation process may entail downloading and installing brand-specific content such as a logo to be presented on the display of the mobile communication device, a power-on video, a power-off video, and other brand-specific content.

SUMMARY

In an embodiment, a method of providing content to a mobile communication device during a service activation of the device is disclosed. The method comprises receiving a first data communication session request by a cell site from a mobile communication device that has not been activated for service in a wireless communication network associated with the cell site and, in response to the first session request, establishing by a gateway node of the wireless communication network a device activation communication service between the mobile communication device and a restricted activation network within the wireless communication network and establishing a first data communication session over the device activation communication service. The method further comprises conducting an activation process at least in part via the first data communication session by an activation server operating in the restricted activation network communicating with the mobile communication device, receiving a second data communication session request by the cell site from an opportunistic content presentation client on the mobile communication device, and, in response to the second session request and while the activation process is conducted by the activation server, establishing by the gateway node a second data communication session over the device activation communication service that connects to a media server operating in the restricted activation network. The method further comprises selecting a content by the media server based on an identity of a subscriber associated with the mobile communication device and transmitting the selected content via the second data communication session by the media server to the mobile communication device, whereby the content is presented on a display of the mobile communication device during activation of the device, where the content is unrelated to the service activation process for the mobile communication device.

In another embodiment, a mobile communication device is disclosed. The mobile communication device comprises a radio transceiver, a visual display, a processor, a non-transitory memory, an activation client stored in the non-transitory memory, and an opportunistic content presentation client stored in the non-transitory memory. When executed by the processor during a process of activating the mobile communication device, the activation client establishes a wireless communication link via the radio transceiver with a provisioning infrastructure over a slot-0 communication channel and completes an activation of the mobile communication device with an activation server in the provisioning infrastructure via a plurality of activation messages exchanged via the slot-0 communication channel. When executed by the processor, the opportunistic content presentation client parses the activation messages, analyzes the parsed activation messages, based on analyzing the parsed activation messages, sends a request for content to a media server over the slot-0 communication channel, receives the requested content via the slot-0 communication channel, and presents the received content in a first window of a split-screen in the visual display, where the activation client presents activation information in a second window of the split-screen.

In yet another embodiment, a method of presenting content on a mobile communication device during a maintenance release process on the mobile communication device is disclosed. The method comprises receiving content by an opportunistic content presentation client on a mobile communication device, where the opportunistic content presentation client executes in an active execution mode of the mobile communication device and where the content is selected for pre-positioning on the mobile communication device based on one of a demographic profile of a subscriber associated with the mobile communication device or a mobile application installed on the mobile communication device, initiating a standby execution mode by the mobile communication device while the active execution mode of the mobile communication device remains, executing a maintenance release process in the standby execution mode of the mobile communication device, and, while the maintenance release process executes in the standby execution mode, presenting the received content by the opportunistic content presentation client executing in the active mode.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
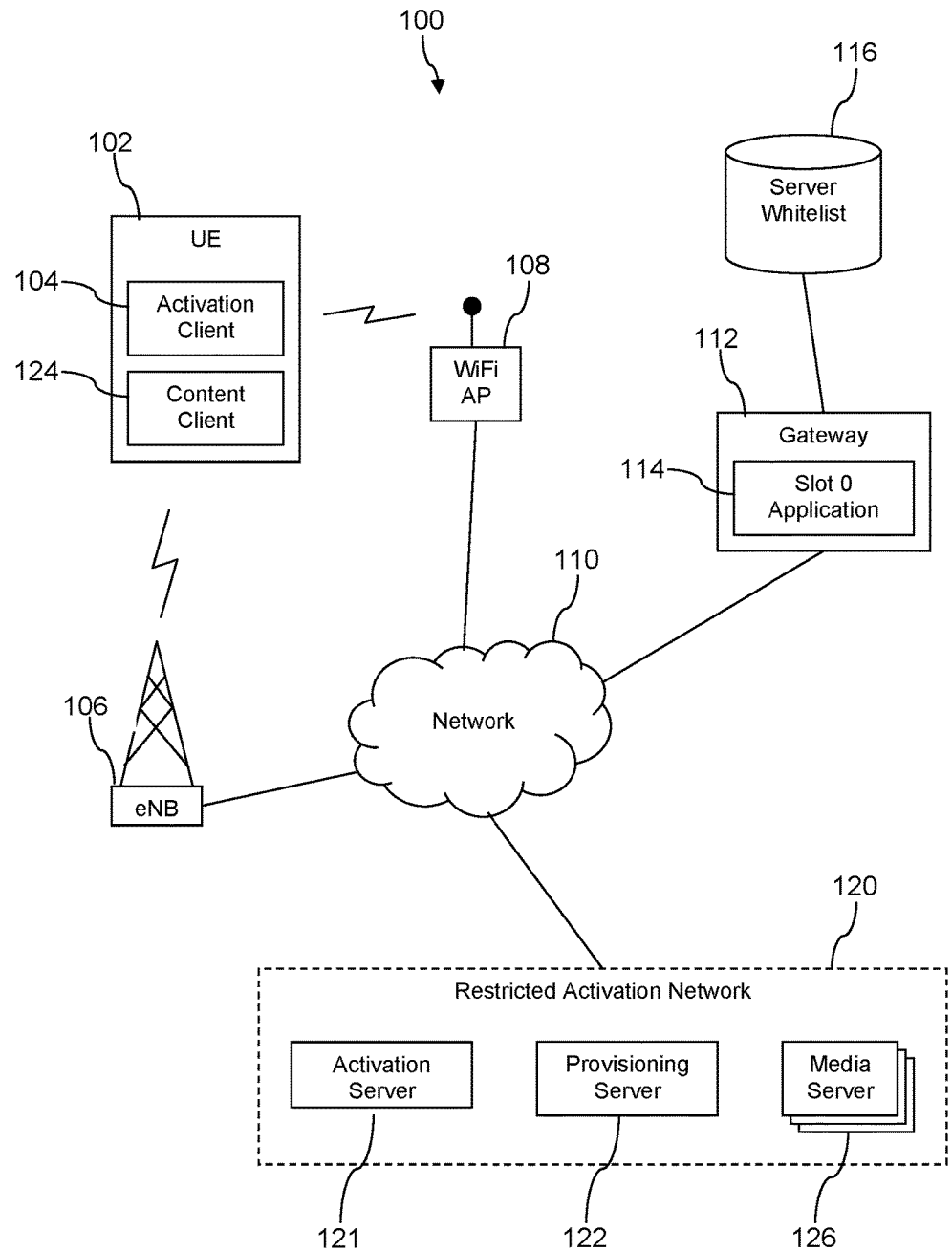
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Mobile communication devices may provide limited service while they undergo initial activation for wireless communication service or when undergoing a maintenance release (MR). These transient operation modes may last 5 minutes, 10 minutes, 15 minutes, or longer. While the mobile communication device is operating in such a mode, the user may not be able to originate standard voice calls, to browse the Internet, or to execute applications on the device. In some cases the user may be obliged to attend upon the device during such modes of operation, being ever ready to respond to a prompt to provide an input selection. The present teaching provides new opportunities for users to employ their time profitably and/or enjoyably while still being near-to-hand to respond to activation input prompts.

The present disclosure teaches presenting content on a display of the mobile communication device during transient operation modes that is unrelated to the process of the transient operation. For example, while a cell phone is being activated and unavailable for originating telephone calls or browsing the Internet, a short tutorial on the functional features of the phone may be presented on a display of the device. As other examples, a feed of sports information may be presented on the device of a user known to be a sports enthusiast, a feed of political news may be presented on the device of a user known to be interested in politics, one or more information messages may be presented on the device of a user who had multiple freeware applications installed on a previous cell phone that suggests upgrades to the freeware apps and proposes to roll the cost of the upgrades into a monthly service bill.

An opportunistic content presentation client application may be installed on the mobile communication device that detects the transient operation mode and presents the content opportunistically during the period of transient limited operational capability. The opportunistic client may establish a data communication session over a slot-0 communication channel during an activation process of the device and request content from a content server in a restricted communication network that is accessible via the slot-0 communication link. During activation, before a mobile communication device has been provisioned for service in the wireless communication network and before the device has been configured with authentication credentials, the device's wireless communication function may be restricted to communication on the slot-0 communication link. The request for content may provide a variety of information, such as a device unique identity, a phone number, a model identity of the device, information about installed mobile applications, and the like. The content server may use the information provided in the request for content to select content targeted in some way to the requesting device. In an embodiment, a wireless communication network infrastructure gateway node mediates access to the restricted communication network, which may be referred to as a "walled garden" type of network in some contexts, and restricts requests to establish data communication sessions between the mobile communication device and a limited set of server computers identified on a white list consulted by the gateway. It is understood that the teachings of the present disclosure may be used in systems that rely on another device activation communication service other than the slot-0 communication link. Another device activation communication service may be used to provide limited communications services that restrict end points that can be reached by an un-activated (or partially activated) mobile device that still promote completing activation processes over the wireless network.

Thus, traditionally, communication services available for use when activating a mobile communication device have been limited if not non-existent (with the exception of E911 emergency communication services). This limitation and restriction makes sense from the perspective of controlling access to the wireless communication network to devices that can be authenticated, but authentication generally relies on authentication credentials provided to the mobile device during activation. By using a device side client, as described herein, the desired securing of access to the wireless communication network can be preserved while still extending some desired communication services to the user during activation.

During a maintenance release, the application layer of the mobile communication device may be disabled. But the application layer is where many mobile applications that users like to use execute, and hence during maintenance releases cannot use the features of their mobile applications. The present disclosure teaches conducting at least an initial portion of the maintenance release on a standby execution partition of the device while leaving the opportunistic content presentation client executing on an active execution partition of the device. The device may deploy a split-screen presentation to support the concurrent presentation of maintenance release related information and of opportunistically presented content. Because wireless communication service providers know when maintenance releases are to be conducted in advance, opportunistic content may be selected and downloaded (e.g., pre-positioned) onto the device in advance of the maintenance release. The content to be pre-positioned can be selected based on a rich knowledge of the user of the device—knowledge about browsed web sites, knowledge of installed mobile applications, knowledge of use of the mobile communication device. The content may provide information about new functionality that is delivered by the maintenance release. If the maintenance release is generally made available to the user community but the subject device does not opt-in to undergo the maintenance release, the opportunistic content presentation client application or another application may present content to the user that explains the benefits of opting-in and receiving the maintenance release.

Turning now to FIG. 1, a communication system 100 is described. In an embodiment, the system 100 comprises a user equipment (UE) 102 having an activation client application 104 and an opportunistic content presentation client application 124, a cell site 106, a network 110, a gateway node 112 having a slot-0 application 114, and a server whitelist data store 116. In an embodiment, the system may further comprise a WiFi access point (AP) 108 or another short-range radio access point. The UE 102 may be a mobile communication device, a mobile phone, a cell phone, a smart phone, a personal digital assistant (PDA), a wearable computer, a headset computer, a media player, a laptop computer, a tablet computer, a notebook computer, or another device. The cell site 106 may be an enhanced node B (eNB), a base transceiver station (BTS), or other wireless communication node. The cell site 106 may provide a wireless communication link to the UE 102 according to one or more of a long term evolution (LTE), a code division multiple access (CDMA), a global system for mobile communications (GSM), or a worldwide interoperability for microwave access (WiMAX) wireless communication protocol. The network 110 comprises one or more public communication network, one or more private communication network, or a combination thereof. The system 100 may comprise any number of UEs 102, cell sites 106, and WiFi APs (108).

When the UE 102 is first purchased or obtained by a user, the UE 102 may undergo an activation process to configure it for use. This activation process may be referred to as activation of the UE 102 or activating the UE 102. The activation process may be conducted, at least in part, by the activation client 104 exchanging activation messages and/or commands with an activation server 121 over a slot-0 communication channel, where the activation server 121 orchestrates or sequences the various steps or phases of activation. During activation, a phone number and/or a mobile network code (MNC) may be configured into the UE 102 by the activation server 121. During activation, provisioning information may be configured by the activation server 121 into a core network of a wireless communication network to support authentication of the UE 102 to receive wireless communication connectivity. During activation, a reference to the UE 102 may be configured into a home location register (HLR), for example by a provisioning server 122. The activation server 121, for example, may command the provisioning server 122 to configure the reference to the UE 102 in the HLR. During activation the activation server 121 may configure the UE 102 with preferred roaming lists (PRLs), brand identity, brand media content, service references such as a voice mail box number and/or a customer care number, and other.

When the UE 102 first requests a wireless communication link with the cell site 106, the UE 102 is not yet provisioned for wireless communication service and hence is not provided a standard communication link. Instead, the UE 102 may be provided with a slot-0 communication channel. This abstract communication channel provides restricted communication access to the UE 102 that, while restricted, is sufficient to complete an activation session.

The gateway node 112 and/or the slot-0 application 114 may make sure that communications of the UE 102, during activation, are confined to a restricted activation network 120. This restricted activation network 120 may be referred to in some contexts as a "walled garden" network. Messages sent by the UE 102, during activation, may be deleted and/or ignored by the gateway node 112 and/or the slot-0 application 114 if they are directed to a node or address not contained within the restricted activation network 120, for example if an IP address to which a message from the UE 102 is directed is not associated with a host that is part of the restricted activation network 120. The gateway node 112 can block the messages sent by the UE 102 and prevent them from passing into the open Internet. The activation server 121, the provisioning server 122, and one or more media servers 126 may be located in the restricted activation network 120. Alternatively, in an embodiment, the provisioning server 122 may not be located in the restricted activation network 120.

In another embodiment, rather than relying on a slot-0 communication channel, the activation process may be based on the cell site 106 directing unauthorized traffic (e.g., the wireless communication of an un-activated UE 102 is not provisioned for wireless communication service and hence is unauthorized traffic) to a specific access point node (APN) responsible for mediating device activation, such as the gateway 112. The activation APN can restrict the communication of the un-activated UE 102 in a way similar to that described above with reference to the slot-0 communication channel paradigm.

The gateway node 112 and/or the slot-0 application 114 may determine which hosts or servers are within the restricted activation network 120 by referencing the server whitelist data store 116. The whitelist data store 116 may identify one or more activation server 121, one or more provisioning server 122, and one or more media server 126. The media server 126 may promote providing media content to the UE 102 during an activation process. A "whitelist" refers to a function whereby communications to white listed addresses or domains is allowed but communications to addresses or domains not explicitly identified in the whitelist is forbidden and blocked. The whitelist data store 116 can be updated with additional addresses and domains as different media servers 126 are added to the restricted activation network 120. The whitelist data store 116, likewise, can be updated by removing addresses and domains as media servers 126 are retired from service.

Figure 2:
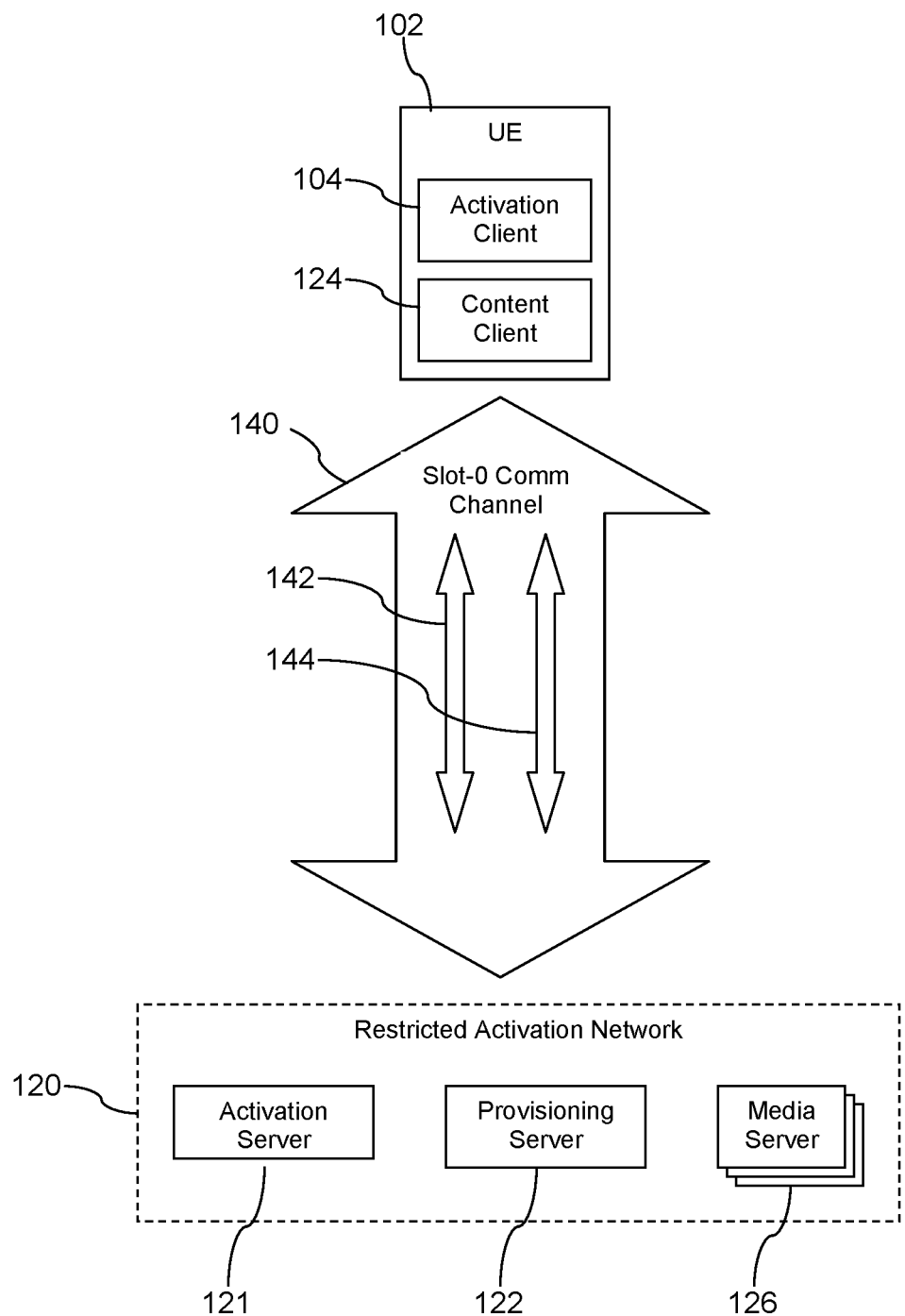
FIG. 2 is a block diagram of a slot-0 communication channel according to an embodiment of the disclosure.

Turning now to FIG. 2, a slot-0 communication channel 140 is described. It is understood that the slot-0 communication channel 140 is an abstract concept and that the actual communication channel is provided over wireless link from the UE 102 to the cell site 106 (or, alternatively, over wireless link from the UE 102 to the WiFi AP 108), from the cell site 106 (or alternatively from the WiFi AP 108) to the network 110, from the network 110 to the gateway node 112, from the gateway node 112 to the network 110, and from the network 110 to the restricted activation network 120. In an embodiment, the connection of the cell site 106 or WiFi AP 108 is controlled by the gateway node 112 or an activation APN which is able to block communication from the UE 102 that is addressed to hosts outside of the restricted activation network 120, for example the communication path from the UE 102 to the network 110 is through the gateway node 112 or the activation APN.

It is the restriction of communication of the UE 102 to the restricted activation network 120, effected by the gateway node 112 and/or the slot-0 application (or the activation APN), that constitutes the slot-0 communication channel. The gateway node 112 and/or the slot-0 application (or the activation APN) can restrict the communication of the UE 102 based on a destination address in messages originated by the UE 102, for example based on a specific host address or a domain address.

The slot-0 communication channel 140 may support a first data communication session 142 established between the activation client 104 and the activation server 121 to complete activation of the UE 102. The slot-0 communication channel 140 may concurrently support a second data communication session 144 established between the opportunistic content presentation client application 124 and one or more media server 126. In an embodiment, the data communication sessions 142, 144 may be conducted, for example, according to a network layer communication protocol such as the transport control protocol (TCP), but in other embodiments a different communication protocol may be employed to provide the data communication sessions 142, 144. The gateway node and/or slot-0 application 140 can examine a destination address of messages from the opportunistic content presentation client application 124 and allow messages directed to the media server 126 (e.g., messages directed to a host or domain that is identified in the whitelist data store 116) to be transported to the media server 126 and drop or block messages directed to hosts that are not identified in the whitelist data store 116.

With reference now to both FIG. 1 and FIG. 2, the opportunistic content presentation client application 124, which may be referred to more concisely as the content client 124, may communicate with the activation client 104 during the course of an activation of the UE 102. The content client 124 may determine that an activation process is in progress, establish the second data communication session 144 over the slot-0 communication channel 140, and request content from the media server 126 via the second data communication session 144. The request for content may be sent as a request message over the second data communication session 144. The request message may comprise information that identifies the UE 102 (e.g., a unique hardware identity of the UE 102), identifies a phone number of the UE 102, identifies a model of the UE 102, identifies a wireless communication service provider brand, and/or identifies a subscription account associated with the UE 102. The request message may comprise information about a phase or stage of an on-going activation process of the UE 102. The request message may comprise information that identifies one or more mobile applications installed on the UE 102, for example installed during the on-going activation process.

The media server 126 may use the information in the request message to select media content to return in response to receiving the request message. This selection process may be referred to as targeting the media content to the UE 102 or to a user of the UE 102. The selection may be based on display and/or execution capabilities of the UE 102, determined based on the information sent in the request message (e.g., an identity of a device model). The selection may be based on interests of the user based on looking up a profile of the user in a data base maintained by the wireless communication service provider, for example in the case where the user is an existing service subscriber that is upgrading his or her phone. It is understood, however, that a profile of a user may be obtained in another way if the user was not previously subscribed for service with the present wireless communication service provider. The selection may further be based on a current phase or stage of the activation process, determined based on the information sent in the request message (e.g., an identity of a phase of the on-going activation process).

The media content may be advertising content. The advertising content may relate to suggesting mobile applications that are suitable to the capabilities of the UE 102. The advertisement content may suggest downloading and installing a premium fee-based version of a free-ware mobile application that is indicated by the information in the request message identifying the subject mobile application as installed on the UE 102 or because the user was known to have installed on his or her prior phone and may offer to bill the premium version of the mobile application to the user's billing account. The advertising content may relate to special interests of the user.

The media content may be an on-boarding tutorial or user guide that explains features of the UE 102, for example in the case the UE 102 has significantly more powerful and/or extensive capabilities than a previous phone used by the user. The media content may be a feed of news or articles selected based on known user interests. For example, a sports news feed may be provided for display for a user known to be a sports enthusiast while a business news feed may be provided for display for a user known to be interested in business. The media content may be general interest news not specifically targeted to the specific user, for example a feed of current road traffic congestion and/or driving conditions, a feed of a weather forecast for the local area, or other general interest information.

As media content is requested, received, and presented by the content client 124 on a display of the UE 102, the content client 124 may request additional media content. The media content may be presented on a display of the UE 102. The media content may be presented in a split-screen on a display of the UE 102. For example, activation messages may be presented in a first split-screen portion of the display of the UE 102 while the media content may be presented in a second split-screen portion of the display of the UE 102. A split-screen display functionality may be supported by an operating system of the UE 102.

The request messages that the content client 124 sends to the media server 126 over the second data communication session 144 can include information identifying a current stage of an activation process of the UE 102. This information about the current stage of the activation process can be used by the media sever 126 to select or target media content to the content client 124. For example, the media server 126 may determine that the activation process is nearly completed and may send media related to taking actions after the UE 102 is fully active. Alternatively, the media server 126 may determine that the activation process is proceeding slowly and may select media content that takes relatively longer to present to the user, for example a movie trailer that relates to a known interest of the user.

As the activation process progresses, the content client 124 can request information from the activation client 104 about mobile applications that may be installed on the UE 102, for example mobile applications that are transferred pursuant to activation from another phone of the user. The content client 124 can include information of mobile applications installed on the UE 102 during activation in request messages that it may send to the media server 126 via the second data communication session 144. In an embodiment, the content client 124 may request copies of activation messages exchanged by the activation client 104 and the slot-0 communication channel 140, for example with the activation server 121. Alternatively, the content client 124 may monitor and capture the activation messages exchanged between the activation client 104 and the slot-0 communication channel 140. The content client 124 may parse the activation messages and analyze the messages to extract information from the messages.

The media server 126 can select media content to return to the content client 124 based on a known installation of mobile applications on the UE 102. For example, if many of the mobile applications that are transferred to the UE 102 are gaming applications, the media server 126 may infer the user is a gamer and may send media content related to games to the content client 124, for example information about games which the upgraded capabilities of the model of the UE 102 now enable for the user.

The content client 124 can have a role during maintenance releases (MRs), for example when a new version of a mobile operating system is downloaded and installed on the UE 102. It is understood that during some maintenance release processes the UE 102 may be unavailable for normal service but yet the user may be a "captive audience," for example the user may be obliged to stay at the phone ready to provide input selections prompted by the device during the maintenance release. During a maintenance release, the application layer operation of the UE 102 may be unavailable. In an embodiment, the opportunistic content presentation client application 124 may be installed or loaded at an execution layer that underlies the application layer. In an embodiment, the opportunistic content presentation client application 124 may be considered to be a portion of the operating system of the UE 102, for example at an upper shell layer of the operating system, that remains active even during maintenance release processes. The opportunistic content client application 124 can select and present content on the display of the UE 102, even when the user is unable to execute a browser application and browse Internet web sites.

A wireless communication service provider may know when a maintenance release process is to take place, and may anticipate this event by pre-positioning media content selected from the media server 126 on the UE 102, for example in a non-transitory memory of the UE 102. The pre-positioned media content can be selected by the media server 126 according to selective and/or targeted processes as described above. Thus, the pre-positioned media content can be selected by the media server 126 based on a profile of the user of the UE 102, based on a browsing history of the user of the UE 102, based on a location of the UE 102, and/or based on other factors. Some of the pre-positioned content may comprise information about the value of completing the maintenance release. For example, approximately 20% of UE 102 users may be reluctant to opt-in for completing a maintenance release. Some of the pre-positioned content may describe the benefits that will be conferred by completing the maintenance release and may assuage user fears that the maintenance release may be malware such as a virus or Trojan. Increasing the up-take rate of maintenance releases can have benefits for both the subscriber and the wireless communication service provider, as the maintenance releases may promote more efficient use of the wireless network and/or correct security vulnerabilities.

When a maintenance release begins processing on the UE 102, the maintenance release may initially proceed on a standby partition of the UE 102 while the opportunistic content presentation client application 124 may execute on an active partition of the UE 102. The display of the UE 102 may make use of an operating system feature referred to as a split-screen, wherein information from the opportunistic content presentation client application 124 may be presented in a first split-screen while information from the maintenance release may be presented in the second split-screen. The opportunistic content presentation client application 124, for example, may present content in the first split-screen. When the maintenance release is completed, the user may cause the UE 102 to reboot (power cycle the UE) or the maintenance release process may automatically cause the UE 102 to reboot. After rebooting, the maintenance release process can execute in the active partition and the opportunistic content presentation client application 124 may execute in the standby partition. After the maintenance release completes its installation by executing in the active partition, the maintenance release completes and the active-standby bifurcation may cease.

Figure 3:
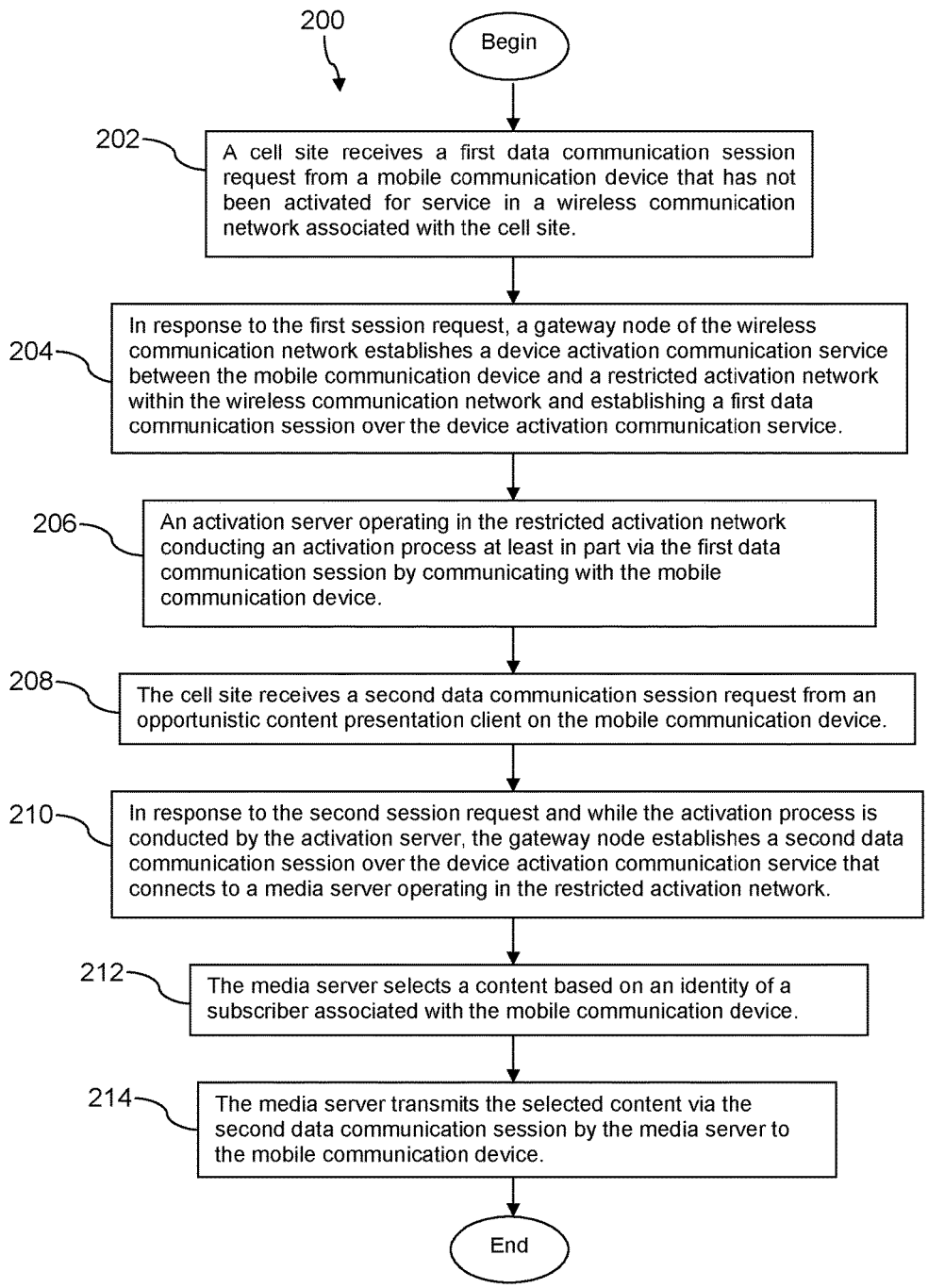
FIG. 3 is a flow chart of a method according to an embodiment of the disclosure.

Turning now to FIG. 3, a method 200 is described. The method 200 may be used to provide content to a mobile communication device, for example the UE 102, during a service activation of the device. At block 202, a cell site (e.g., the cell site 106) receives a first data communication session request from a mobile communication device that has not been activated for service in a wireless communication network associated with the cell site. At block 204, in response to the first session request, a gateway node of the wireless communication network establishes a device activation communication service between the mobile communication device and a restricted activation network within the wireless communication network and establishing a first data communication session over the device activation communication service.

At block 206, an activation server operating in the restricted activation network conducting an activation process at least in part via the first data communication session by communicating with the mobile communication device. At block 208, the cell site receives a second data communication session request from an opportunistic content presentation client on the mobile communication device. At block 210, in response to the second session request and while the activation process is conducted by the activation server, the gateway node establishes a second data communication session over the device activation communication service that connects to a media server operating in the restricted activation network.

At block 212, the media server selects a content based on an identity of a subscriber associated with the mobile communication device. At block 214, the media server transmits the selected content to the mobile communication device via the second data communication session. As a result of performing the method 200, the content may be presented on a display of the mobile communication device during activation of the device, where the content is unrelated to the service activation process for the mobile communication device.

Figure 4:
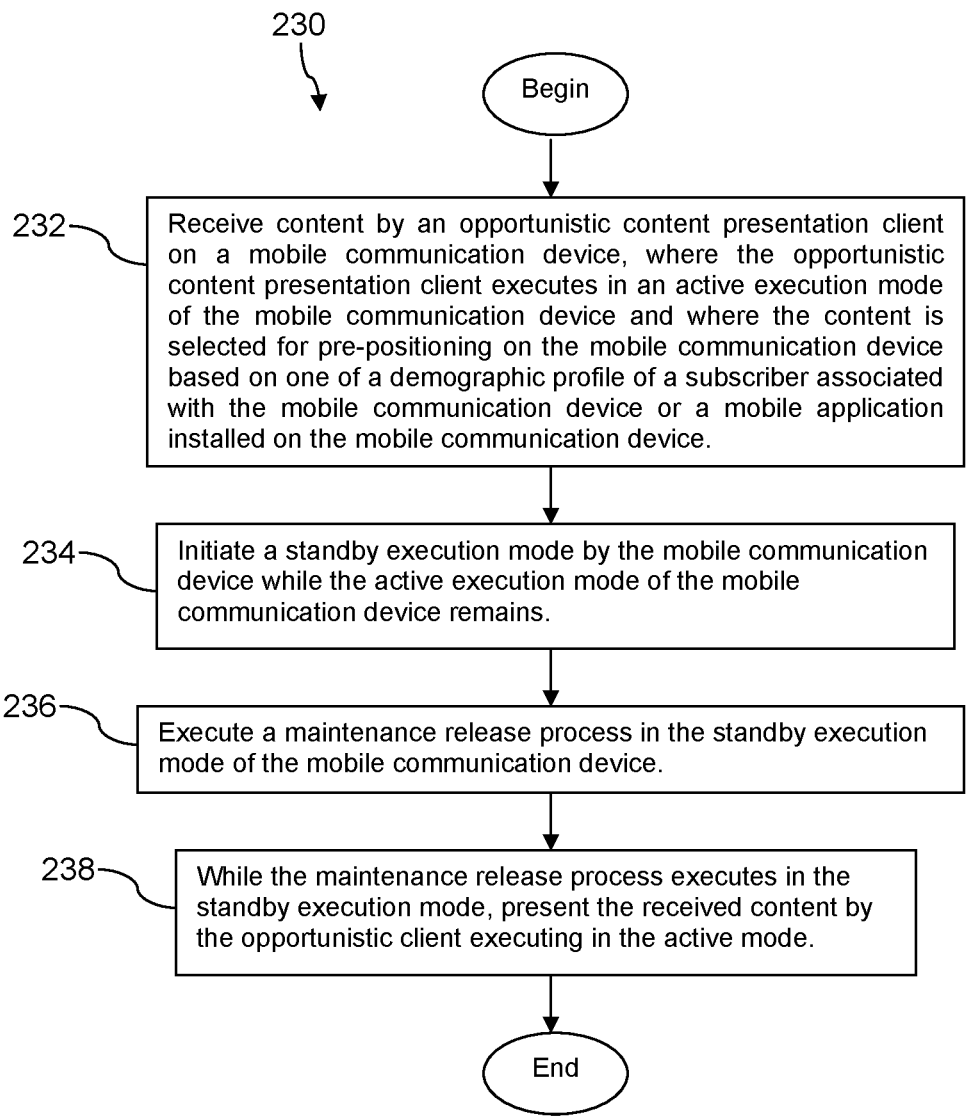
FIG. 4 is a flow chart of another method according to an embodiment of the disclosure.

Turning now to FIG. 4, a method 230 is described. The method 200 may be performed to present content on a mobile communication device during a maintenance release on the device. At block 232, an opportunistic content presentation client on a mobile communication device receives content, where the opportunistic content presentation client executes in an active execution mode of the mobile communication device and where the content is selected for pre-positioning on the mobile communication device based on one of a demographic profile of a subscriber associated with the mobile communication device or a mobile application installed on the mobile communication device. At block 234, the mobile communication device initiates a standby execution mode while the active execution mode of the mobile communication device remains. At block 236, executing a maintenance release process in the standby execution mode of the mobile communication device. At block 238, while the maintenance release process executes in the standby execution mode, the opportunistic client executing in the active mode presents the received content on a display of the mobile communication device.

Figure 5:
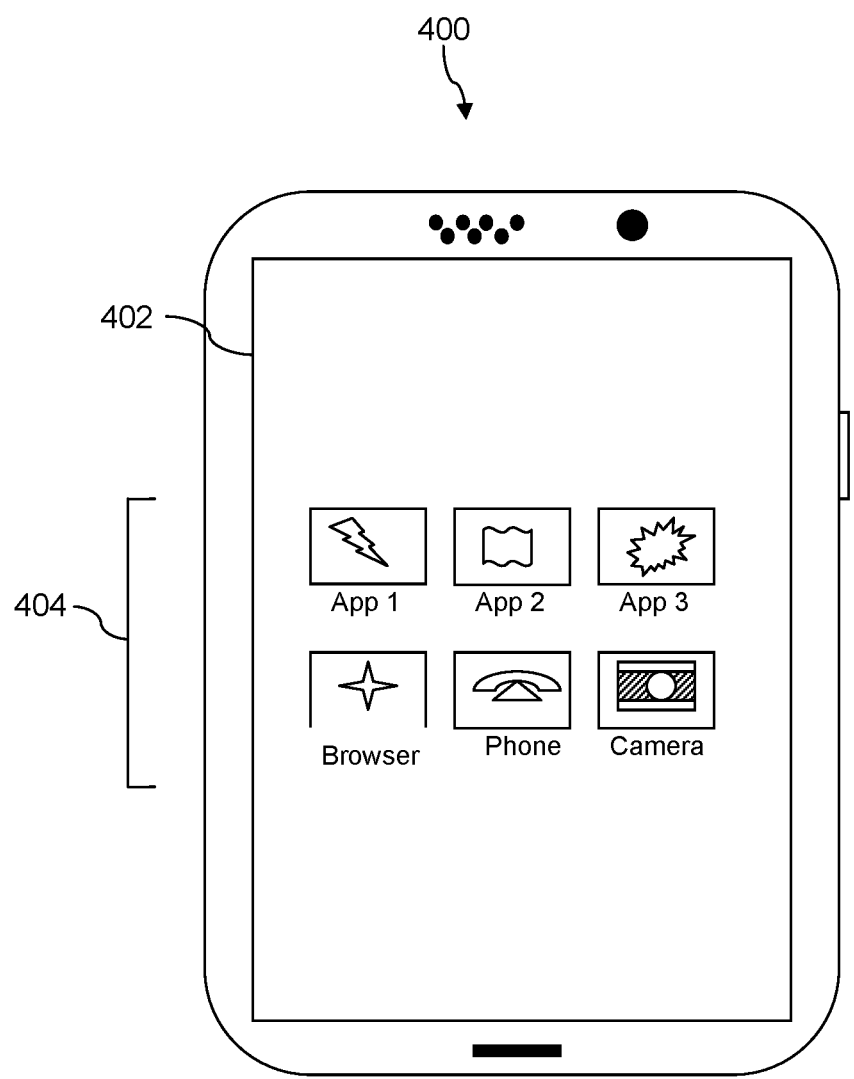
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
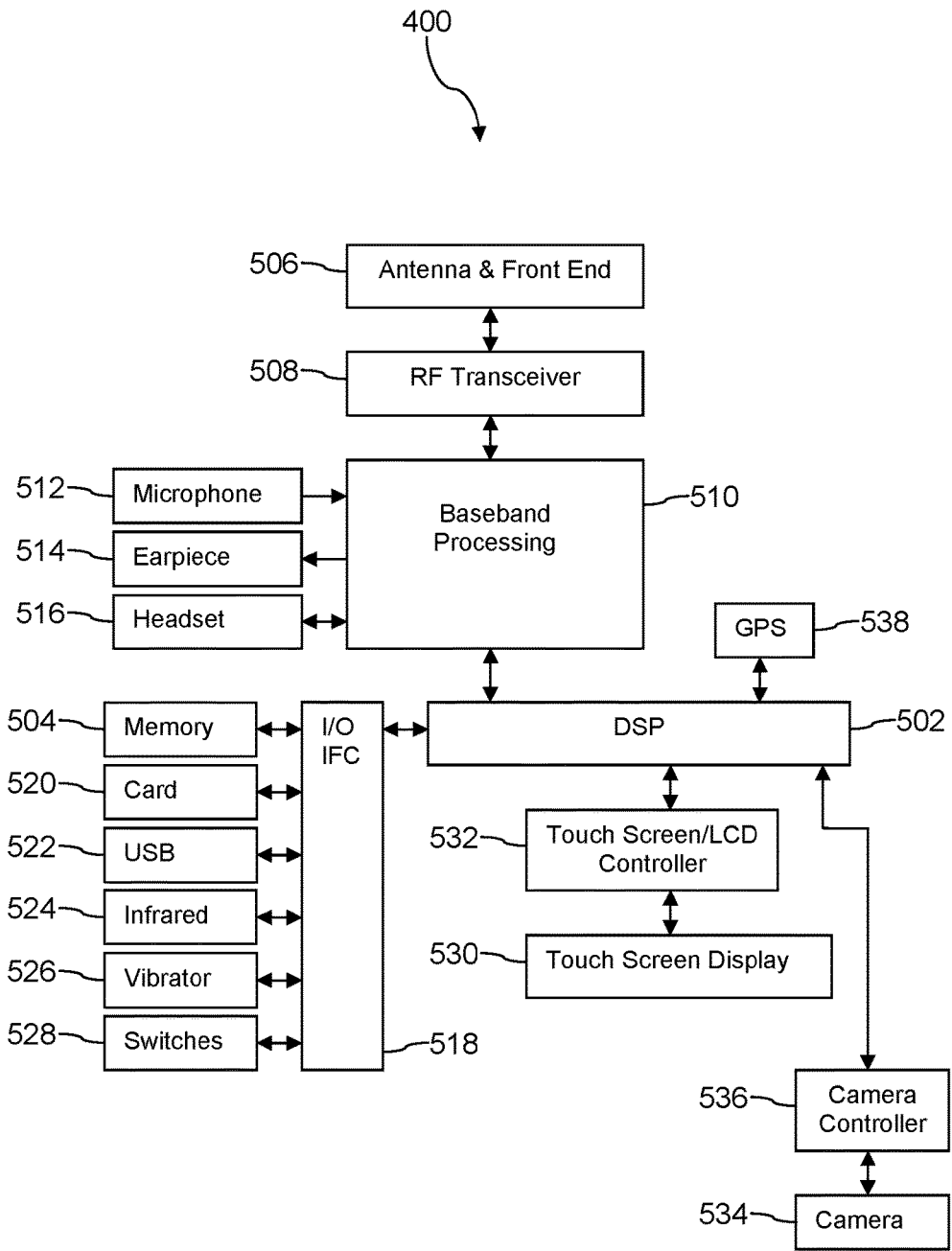
FIG. 6 is a block diagram of a hardware architecture of a mobile communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
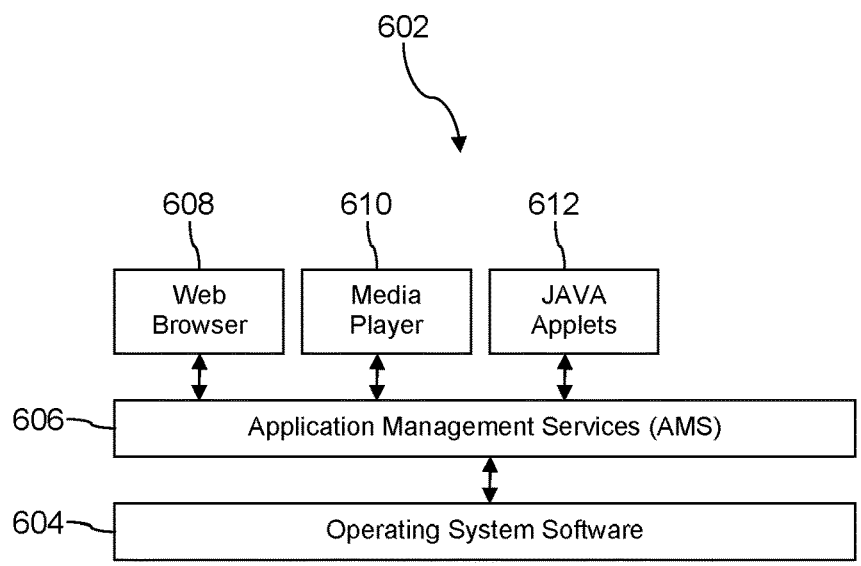
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

In an embodiment a third party application may be dynamically downloaded and installed during a first time that the mobile communication device 400 enters a retail store (e.g., any of a plurality of retails stores associated with a particular enterprise) and may be activated on subsequent entries into a retail store. Alternatively, the third party application 614 may be installed in another way (e.g., the user elects to install the application 614, for example to obtain coupons or other desirable features provided via the application 614).

Figure 7B:
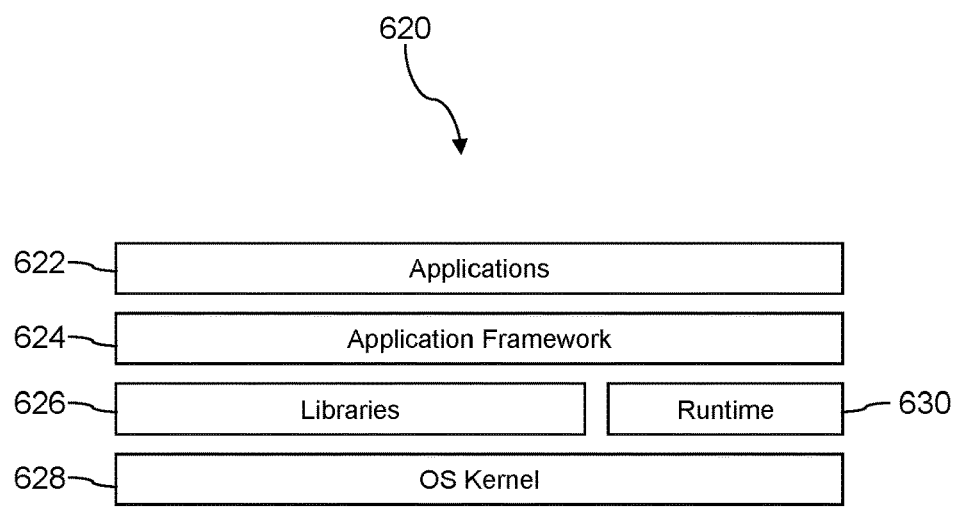
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
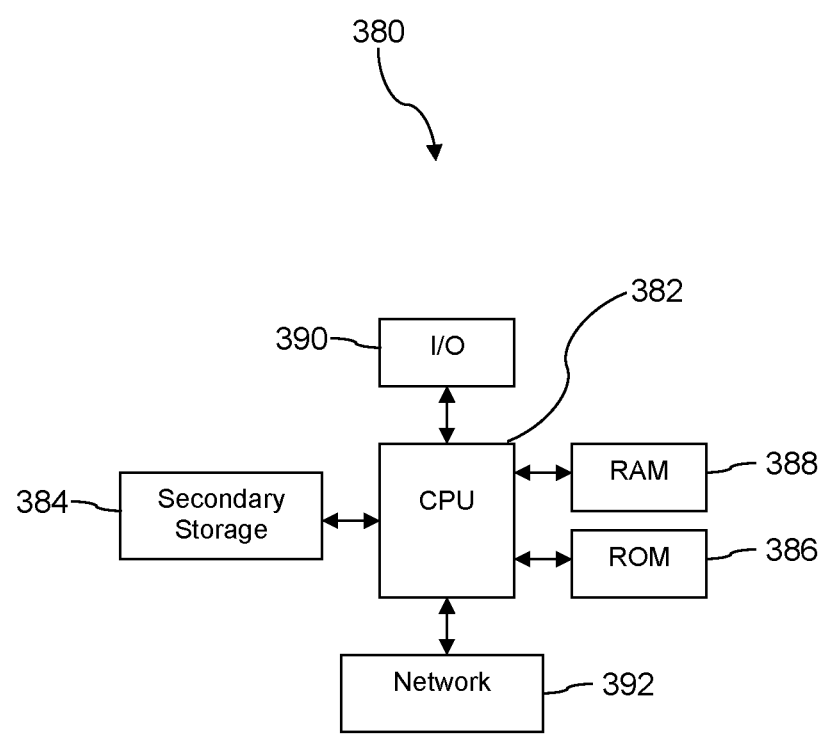
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing content to a mobile communication device during a service activation of the device, comprising:
receiving a first data communication session request by a cell site from a mobile communication device that has not been activated for service in a wireless communication network associated with the cell site;
in response to the first data communication session request, establishing by a gateway node of the wireless communication network a device activation communication service between the mobile communication device and a restricted activation network within the wireless communication network and establishing a first data communication session over the device activation communication service;
conducting an activation process at least in part via the first data communication session by an activation server operating in the restricted activation network communicating with the mobile communication device;
receiving a second data communication session request by the cell site from an opportunistic content presentation client on the mobile communication device;
in response to the second data communication session request and while the activation process is conducted by the activation server, establishing by the gateway node a second data communication session over the device activation communication service that connects to a media server operating in the restricted activation network;
selecting a content by the media server based on an identity of a subscriber associated with the mobile communication device; and
transmitting the selected content via the second data communication session by the media server to the mobile communication device,
whereby the content is presented on a display of the mobile communication device during activation of the device, where the content is unrelated to the service activation process for the mobile communication device.

2. The method of claim 1, wherein the mobile communication device is one of a mobile phone, a cell phone, a smart phone, a personal digital assistant (PDA), a media player, a wearable computer, a headset computer, a laptop computer, a notebook computer, or a tablet computer.

3. The method of claim 1, wherein the cell site established a wireless communication link to the mobile communication device according are least one of a long term evolution (LTE), a code division multiple access (CDMA), a global system for mobile communications (GSM), or a worldwide interoperability for microwave access (WiMAX) wireless communication protocol and wherein the first data communication session and the second data communication session is provided partially over the wireless communication link between the mobile communication device and the cell site.

4. The method of claim 1, wherein the activation server provisions the mobile communication device for service in a core network of the wireless communication network.

5. The method of claim 1, wherein the activation process comprises transmitting branding media content to the mobile communication device via the first data communication session.

6. The method of claim 1, wherein the second data communication session request comprises information about the mobile communication device, and wherein the selected content is further selected by the media server based on the information in the second data communication session request.

7. The method of claim 6, wherein the information about the mobile communication device comprises at least one of an identity of a mobile application installed on the mobile communication device, a model of the mobile communication device, or a phase of the activation process on the mobile communication device.

8. The mobile communication device of claim 1, wherein the activation process comprises configuring a reference to the mobile communication device into a home location register (HLR) in the wireless communication network by the activation server.

9. The mobile communication device of claim 8, wherein the activation process further comprises configuring a preferred roaming list (PRL) into the mobile communication device over the first data communication session by the activation server.

10. A mobile communication device, comprising:
a radio transceiver;
a visual display;
a processor;
a non-transitory memory;
an activation client stored in the non-transitory memory that, when executed by the processor during a process of activating the mobile communication device, establishes a wireless communication link via the radio transceiver with a provisioning infrastructure over a slot-0 communication channel and completes an activation of the mobile communication device with an activation server in the provisioning infrastructure via a plurality of activation messages exchanged via the slot-0 communication channel; and
an opportunistic content presentation client stored in the non-transitory memory that, when executed by the processor,
parses the activation messages,
analyzes the parsed activation messages,
based on analyzing the parsed activation messages, sends a request for content to a media server over the slot-0 communication channel,
receives the requested content via the slot-0 communication channel, and
presents the received content in a first window of a split-screen in the visual display, where the activation client presents activation information in a second window of the split-screen.

11. The mobile communication device of claim 10, wherein the mobile communication device is one of a mobile phone, a cell phone, a smart phone, a personal digital assistant (PDA), a media player, a wearable computer, a headset computer, a laptop computer, a notebook computer, or a tablet computer.

12. The mobile communication device of claim 10, wherein the radio transceiver is a WiFi radio transceiver and establishes the wireless communication link with a WiFi access point.

13. The mobile communication device of claim 10, wherein the opportunistic content presentation client is installed as a part of an operating system of the mobile communication device.

14. The mobile communication device of claim 10, wherein the activation client establishes a first data communication session over the slot-0 communication channel and sends and receives activation messages over the first data communication session and the opportunistic content presentation client establishes a second data communication session over the slot-0 communication channel and sends the request for content and receives the requested content over the second data communication session.

15. The mobile communication device of claim 10, wherein the request for content comprises information about a mobile application installed as part of the process of activating the mobile communication device.

16. The mobile communication device of claim 10, wherein the request for content comprises information about a model of the mobile communication device.

17. The mobile communication device of claim 10, wherein the request for content comprises information about a current phase of the process of activating the mobile communication device.

18. The mobile communication device of claim 10, wherein activation of the mobile communication device further comprises receiving a phone number via the slot-0 communication channel and configuring the phone number into the mobile communication device.

* * * * *